(12) United States Patent
Chadha et al.

(10) Patent No.: US 6,876,699 B1
(45) Date of Patent: Apr. 5, 2005

(54) FILTER CIRCUIT FOR A BIT PUMP AND METHOD OF CONFIGURING THE SAME

(75) Inventors: Mandeep Singh Chadha, Austin, TX (US); Zhuo Fu, Austin, TX (US); Shawn R. McCaslin, Buda, TX (US); Nicholas R. van Bavel, Austin, TX (US)

(73) Assignee: Lucent Technologies Inc., Murray Hill, NJ (US)

(*) Notice: Subject to any disclaimer, the term of this patent is extended or adjusted under 35 U.S.C. 154(b) by 751 days.

(21) Appl. No.: 09/650,851

(22) Filed: Aug. 29, 2000

(51) Int. Cl.⁷ ................................................. H03H 7/30

(52) U.S. Cl. ..................... 375/233; 375/229; 375/230; 375/296; 370/419

(58) Field of Search ................................ 375/296, 285, 375/229, 230, 232, 233, 346; 370/419, 497, 522; 379/406.1

(56) References Cited

U.S. PATENT DOCUMENTS

| | | | |
|---|---|---|---|
| 4,707,824 A | | 11/1987 | Kanemasa |
| 4,924,492 A | | 5/1990 | Gitlin et al. |
| 5,351,087 A | | 9/1994 | Christopher et al. |
| 5,353,279 A | | 10/1994 | Koyama |
| 5,396,517 A | | 3/1995 | Yedid et al. |
| 5,418,849 A | | 5/1995 | Cannalire et al. |
| 5,512,898 A | * | 4/1996 | Norsworthy et al. ........ 341/155 |
| 5,604,769 A | * | 2/1997 | Wang .......................... 375/229 |
| 5,610,909 A | | 3/1997 | Shaw |
| 5,631,899 A | | 5/1997 | Duttweiler |
| 5,668,794 A | | 9/1997 | McCaslin et al. |
| 5,732,107 A | | 3/1998 | Phillips et al. |
| 5,748,126 A | | 5/1998 | Ma et al. |
| 5,809,033 A | * | 9/1998 | Turner et al. ............... 370/522 |
| 5,841,809 A | | 11/1998 | Koizumi et al. |
| 6,208,671 B1 | | 3/2001 | Paulos et al. |
| 6,240,128 B1 | | 5/2001 | Banerjea et al. |
| 6,389,064 B1 | | 5/2002 | Dholakia et al. |
| 6,434,233 B1 | * | 8/2002 | Bjarnason et al. ..... 379/406.01 |
| 6,526,139 B1 | | 2/2003 | Rousell et al. |
| 6,597,787 B1 | | 7/2003 | Lindgren et al. |
| 6,628,738 B1 | | 9/2003 | Peeters et al. |

OTHER PUBLICATIONS

Floyd M. Gardner "Interpolation in Digital Modems—Part 1: Fundamentals" IEEE Transactions on Communications, vol. 41, No. 3, Mar. 1993; pp. 501–507.

Lars Erup, et al. "Interpolation in Digital Modems—Part II: Implementation and Performance" IEEE Transactions on Communications, vol. 41, No. 6, Jun. 1993; pp. 998–1008.

James D. Barnette, et al.; U.S. Appl. No. 09/652,116, filed Aug. 29, 2000 entitled "Resampler for a bit Pump and Method of Resampling a Signal Associated Therewith"; pp. 1–59; 6 drawing sheets.

Mandeep Singh Chadha, et al.; U.S. Appl. No. 09/650,854, filed Aug. 29, 2000 entitled "Separation Circuit for an Echo Canceling System and Method of Operating the Same"; pp. 1–67; 6 drawing sheets.

(Continued)

Primary Examiner—Shuwang Liu

(57) ABSTRACT

A filter circuit, method of configuring the filter circuit, and a bit pump and transceiver employing the circuit and method. In one embodiment, the filter circuit includes a noise prediction equalizer that generates a noise prediction equalizer coefficient during activation of the bit pump to reduce an intersymbol interference associated with a receive signal propagating along a receive path of the bit pump. The filter circuit also includes a decision feedback equalizer that generates a decision feedback equalizer coefficient during the activation of the bit pump to reduce the intersymbol interference associated with the receive signal. The noise prediction equalizer is concatenated with the decision feedback equalizer during showtime of the bit pump to form a precoder associated with a transmit path of the bit pump.

28 Claims, 6 Drawing Sheets

OTHER PUBLICATIONS

Mandeep Singh Chadha, et al.; U.S. Appl. No. 09/650,853, filed Aug. 29, 2000 entitled "Echo Canceling System for a Bit Pump and Method of Operating the Same"; pp. 1–60; 5 drawing sheets.

James D. Barnette; U.S. Appl. No. 09/650,850, filed Aug. 29, 2000 entitled "An Interpolator, a Resampler Employing the Interpolator and Method of Interpolating a Signal Associated Therewith"; pp. 1–78; 6 drawing sheets.

P.P. Vaidyanathan "Multirate Systems and Filter Banks" Prentice Hall Signal Processing Series; Chap. 5, Section 5.3; pp. 211–213; Jul. 1992.

"Multirate Systems and Filter Banks." by P. P. Vaidyanathan. Prentice Hall Signal Processing Series. Chap. 5. Section 5.3. pp. 211–213, Jul. 1992, no copy.

* cited by examiner

FILTER CIRCUIT FOR A BIT PUMP AND METHOD OF CONFIGURING THE SAME

CROSS-REFERENCE TO RELATED APPLICATION

This U.S. application is related to the following U.S. applications.

| Ser. No. | Reference Number | File Date | Title |
| --- | --- | --- | --- |
| 09/650,853 | Chadha 3-3-1 | Aug. 29, 2000 | ECHO CANCELING SYSTEM FOR A BIT PUMP AND METHOD OF OPERATING THE SAME |
| 09/650,854 | Chadha 2-2-2 | Aug. 29, 2000 | SEPARATION CIRCUIT FOR AN ECHO CANCELING SYSTEM AND METHOD OF OPERATING THE SAME |
| 09/652,116 | Barnette 2-2 | Aug. 29, 2000 | RESAMPLING FOR A BIT PUMP AND METHOD OF RE-SAMPLING A SIGNAL ASSOCIATED THEREWITH |
| 09/650,850 | Barnette 1 | Aug. 29, 2000 | AN INTERPOLATOR, A RE-SAMPLER EMPLOYING THE INTERPOLATOR AND METHOD OF INTERPOLATING A SIGNAL ASSOCIATED THEREWITH |

The above-referenced U.S. applications are commonly assigned with the present invention and incorporated herein by reference.

TECHNICAL FIELD OF THE INVENTION

The present invention is directed, in general, to digital signal processing and, more specifically, to a filter circuit for a bit pump and a transceiver employing the bit pump.

BACKGROUND OF THE INVENTION

The existing public switched telephone network represents a significant capital investment that has taken place in great part over the last 80 years. The public switched telephone network was originally designed for voice services (so-called plain old telephone service) and was entirely analog.

Originally, the public switched telephone network included "local loops," which connected homes and businesses to central office switches. This allowed anyone having a telephone connected to the central office switch to call one another. A given central office typically only covers a relatively small area.

To allow people to call one another from greater distances, central office switches were interconnected by analog trunks. Unfortunately, signal quality suffered greatly as distances increased. Filters and amplifiers improved quality, but only to a limited extent.

Over time, however, the analog trunks (that may be thought of as forming the "backbone" of the public switched telephone network) were replaced with land-based microwave, satellite and optical fiber links. Public switched telephone network signals ("traffic") were digitized for transmission over the backbone, significantly improving signal quality, service and reliability.

To maximize utilization of the backbone, an assumption was made that, at the time, seemed straightforward. The assumption was based on the observation that public switched telephone network traffic consisted of human speech, which by its nature occupies frequencies below 4 kilohertz (kHz).

Thus, it was decided that higher frequencies were of limited value and represented a waste of bandwidth if the traffic were to be digitized and transmitted. The higher frequencies were, as a result, discarded when signals were initially digitized. The net effect was that more conversations were carried over a given microwave, satellite or fiber link.

While truncating the frequencies above 4 kHz was of no consequence to the transmission of speech, the same proved not to be true for data. In the quest for speed, computer modems have attempted to use as much bandwidth as possible, and in the most clever manner. Unfortunately, even in view of the most clever modems, the 4 kHz digitization cutoff has imposed an apparent limit on the speed of such devices. Unfortunately, the analog local loops have unjustly taken most of the blame for the speed limitation.

Digital subscriber line (DSL), developed over the past few years, presents a novel solution to the speed limitation conundrum. According to DSL, local loops are employed to carry speech in a stream at normal frequencies (exclusively below 4 kHz). The local loops, however, are also called upon to carry data in a stream at frequencies exclusively above 4 kHz. DSL termination circuits located at the home or business and the central office combine and separate the voice and data streams as they enter and leave the local loop. Once separated at the central office, the voice stream is digitized for relay over the public switched telephone network backbone as before, and by employing the existing infrastructure. The data stream, however, is sent through the public switched telephone network or another network (such as the Internet via a different path), without imposition of the 4 kHz artificial bandwidth limits.

One form of DSL, Asymmetrical DSL (ADSL) was designed with the Internet particularly in mind and accordingly emphasizes a downloading of data over uploading of data (which is the nature of Internet "surfing"). ADSL uses the frequency spectrum between 0–4 kHz for the plain old telephone service stream and 4 kHz to 2.2 MHZ for the data stream. Depending on the design, length and conditions of the local loop, ADSL can offer speeds up to 9 Mbits/s (Mbps) for downstream (network to user) and up to 800 Kbps for upstream (user to network) communication.

Another form of DSL, High-Bit Rate DSL (HDSL) is a technology extension of DSL. HDSL is a symmetric transport medium, meaning that it provides 1.544 Mbps transmission speed both downstream and upstream over distances as far as 12,000 feet, without repeaters. Because about 20% of loops are longer than 12,000 feet, the industry has developed a repeater for HDSL that effectively doubles the span's reach to 24,000 feet. HDSL is based on a technology called adaptive equalization, which digitally analyzes and then compensates for distortion, imperfections in the copper line itself as well as adverse environmental conditions, throughout the transmission process. Furthermore, HDSL transmits full-duplex signals on each pair of wires and uses echo cancellation to separate the receive signals from the transmit signals.

To enhance and build on that inherent symmetry, standards bodies are now working on HDSL's next generation, called HDSL2. HDSL2 promises full-duplex T-Carrier 1 (T1) payload over one copper loop, while still delivering the same time and cost efficiencies for T1 deployment that HDSL offers. Carriers everywhere are running out of copper in their local loop plants. One of HDSL2's key benefits will focus squarely on and alleviate that concern. Essentially, the technology will double the number of available T1 lines because it requires only a single copper pair, compared with the two pairs required by the standard HDSL. As a result, HDSL2 may replace standard HDSL for most T1 deployments in the future, although HDSL will remain an option in those cases in which there may still be some engineering reasons for deploying a two-loop solution. One example is with long loops in excess of 12,000 feet, where span-powered HDSL repeaters may still be necessary. Beyond just workhorse T1 deployment, HDSL2 also should prove to be a viable competitive technology for Internet access applications that require symmetrical data delivery.

HDSL2, therefore, further enhances the noteworthy advantages associated with DSL. First, DSL-based technology does not require local loops to be replaced. Second, DSL-based technology overcomes the 4 kHz digitization barrier without requiring changes to existing public switched telephone network voice-handling equipment. Third, DSL-based technology requires relatively little equipment to combine and later separate speech and data streams. Fourth, DSL-based technology allows speech and data to occur simultaneously over the same local loop. HDSL2 now promises full-duplex T1 payload over one copper loop, while still delivering the same time and cost efficiencies for T1 deployment that its predecessor, HDSL, offers.

Some technical challenges, however, remain for HDSL2. One is designing a transceiver that can accommodate the full-duplex T1 payload in conjunction with the standard defined by American National Standards Institute (ANSI) committee T1E1.4 (June 1995), which is incorporated herein by reference. In conjunction therewith, precoding techniques may be employed in the transmit path of the digital signal processing portion of the transceiver as a preprocessor to a modulator portion of the transceiver. The precoding techniques are employed to, in part, eliminate error propagation, which may otherwise occur. Error propagation may occur as a result of incorrect decisions often made in a feedback section of other filter circuits not employing precoding techniques. A well known precoding technique employs the Tomlinson-Harashima algorithm.

A Tomlinson-Harashima precoder typically consists of a feedback filter that is used in conjunction with a modulo operator to make the precoder operation more stable. Without the modulo operator, the feedback filter would behave like a recursive filter, which could become unstable depending on the values of its filter coefficients. Coefficient values of the feedback filter are obtained during a startup training period of the transceiver. The output of the Tomlinson-Harashima precoder is typically the sum of the modulo remainder of an input sequence and the output of the feedback filter. The signal magnitude expansion of a Tomlinson-Harashima precoder at the transmitter of the transceiver is limited by the modulo operation.

The feedback filter of the Tomlinson-Harashima precoder consists of a signal delay line that is coupled to an array of coefficients. Each of the coefficients corresponds to one of the stages of delay. Performance of the Tomlinson-Harashima precoder is determined by the length of the feedback filter, which of course is determined by the number of stages of delay and a corresponding number of coefficients. It may be shown that a length of at least 130 to 180 stages of delay is typically required for adequate to exceptional performance. Unfortunately, the cost of hardware needed to accomplish this function is also proportional to the number of stages used and therefore may be prohibitive or an impediment for many applications requiring an appropriate performance.

Accordingly, what is needed in the art is a more effective precoding configuration, employable with a transceiver, that provides appropriate performance to enhance communication over, for instance, a network employing DSL-based technology such as HDSL2.

SUMMARY OF THE INVENTION

To address the above-discussed deficiencies of the prior art, the present invention provides a filter circuit, method of configuring the filter circuit, and a bit pump and transceiver employing the circuit and method. In one embodiment, the filter circuit includes a noise prediction equalizer that generates a noise prediction equalizer coefficient during activation of the bit pump to reduce an intersymbol interference associated with a receive signal propagating along a receive path of the bit pump. The filter circuit also includes a decision feedback equalizer that generates a decision feedback equalizer coefficient during the activation of the bit pump to reduce the intersymbol interference associated with the receive signal. The noise prediction equalizer is concatenated with the decision feedback equalizer during showtime of the bit pump to form a precoder associated with a transmit path of the bit pump.

The present invention introduces, in one aspect, a filter circuit that performs an equalization function during the activation of the bit pump and is reconfigured as a precoder during showtime of the bit pump. During activation, the various adaptive circuits of the bit pump are trained to optimize their performance associated with a particular operating environment. Showtime begins when activation is complete and a condition of data transparency exists allowing stable operation of the bit pump. At the inception of showtime, the noise prediction equalizer and the decision feedback equalizer along with their coefficient values developed during activation are reconfigured to serve as the precoder. The reconfiguration provides a more effective solution for performance enhancement of the bit pump during showtime.

In one embodiment of the present invention, the noise prediction equalizer and the decision feedback equalizer are coupled to a feed forward equalizer during the activation of the bit pump. In a related, but alternative embodiment, the noise prediction equalizer and the decision feedback equalizer are coupled to a slicer during the activation of the bit pump. In an embodiment to be illustrated and described, the feed forward equalizer cooperates with the decision feedback equalizer to whiten noise and equalize the linear distortion caused by a channel during the activation of the bit pump. The slicer performs a symbol-by-symbol decoding during the activation of the bit pump.

In one embodiment of the present invention, each of the noise prediction equalizer and the decision feedback equalizer include delay lines associated therewith. The delay lines allow a sequence of past signal representations to be presented that support additional processing to further refine the responses of the noise prediction equalizer and the decision feedback equalizer.

In one embodiment of the present invention, the noise prediction equalizer and the decision feedback equalizer include noise prediction equalizer and decision feedback equalizer coefficient arrays respectively associated therewith. The coefficient arrays, associated with the noise prediction equalizer and the decision feedback equalizer, contain filter coefficients that determine the response of these units. In an embodiment to be illustrated and described, the coefficients are adaptively determined to enhance the system performance.

In one embodiment of the present invention, the precoder is a Tomlinson-Harashima precoder. Of course, other preceding algorithms and precoder architectures are well within the broad scope of the present invention.

In one embodiment of the present invention, the precoder includes a plurality of taps. In an embodiment to be illustrated and described, the precoder includes a delay line that employs 180 taps or stages. Of course, any number of taps may be employed as appropriate for an application.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
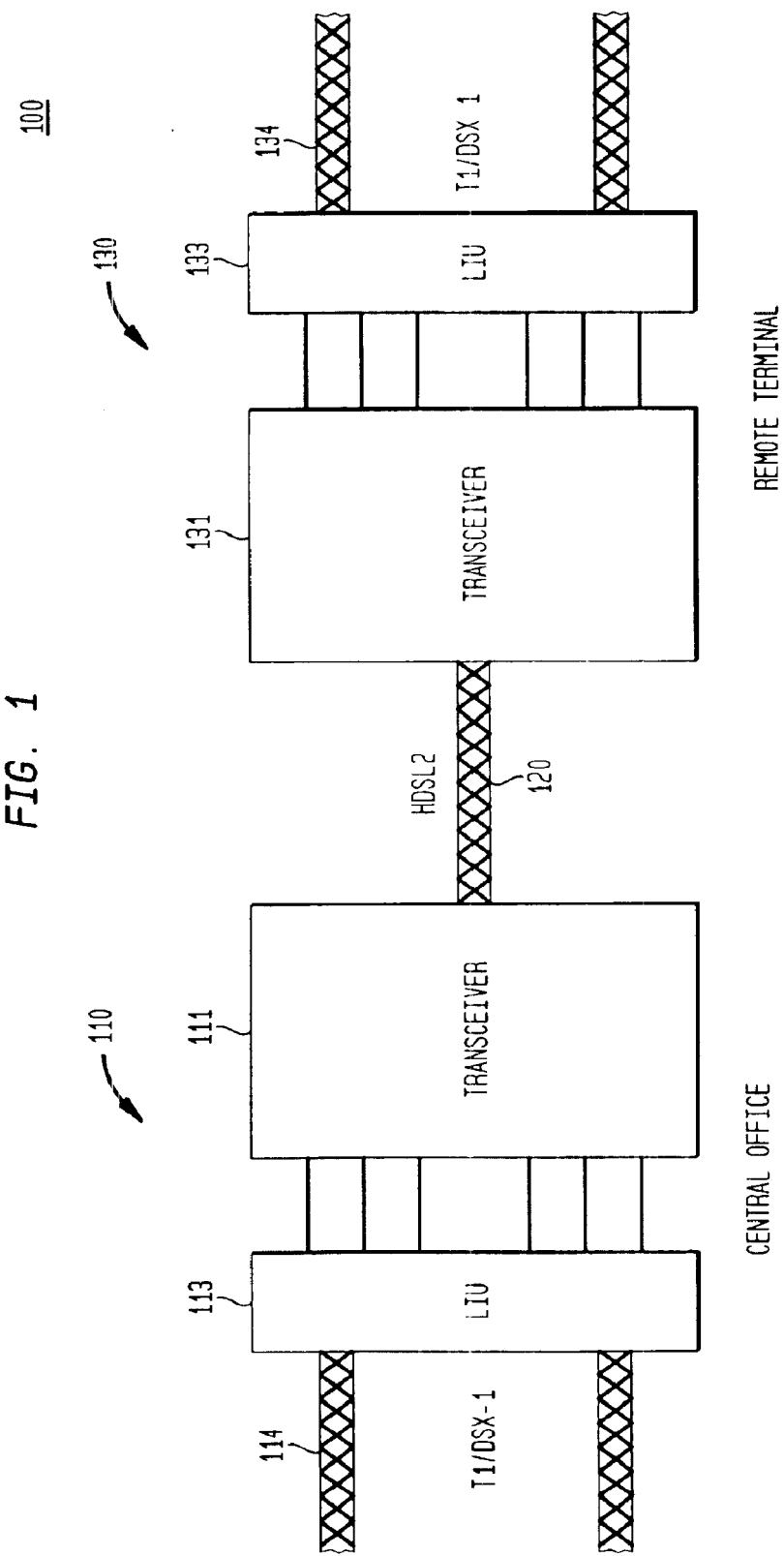
FIG. 1 illustrates a system level diagram of an embodiment of a communications network within which an embodiment of a transceiver constructed according to the principles of the present invention may operate.

Referring initially to FIG. 1, illustrated is a system level diagram of an embodiment of a communications network, generally designated 100, within which an embodiment of a transceiver constructed according to the principles of the present invention may operate. The communications network 100 may form a portion of a larger communications network (e.g., the public switched telephone network) and may advantageously provide high-bit-rate digital subscriber line service over a single twisted pair wire (commonly referred to as HDSL2). The communications network 100 includes a central office 110 and a remote terminal 130. The central office 110 embodies any conventional or later developed switching system that facilitates communications over the communications network 100. The remote terminal 130 embodies any conventional or later developed communications device (e.g., a multimedia personal computer) adapted to communicate with the communications network 100. It should be understood that the central office 110 may be advantageously coupled to a plurality of remote terminals 130.

The central office 110 is coupled via one or more central office trunks (one of which is designated 114) to the public switched telephone network. The central office trunks 114 are designated as either T1 long haul or DSX-1 short haul trunks for illustrative purposes only. The central office trunks 114 are coupled via a cental office line interface unit 113 to a central office transceiver 111.

The remote terminal 130 is coupled via one or more remote terminal trunks (one of which is designated 134) to the public switched telephone network. The remote terminal trunks 134 are also designated as either T1 long haul or DSX-1 short haul trunks for illustrative purposes only. The remote terminal trunks 134 are coupled via a remote terminal line interface unit 133 to a remote terminal transceiver 131.

The cental office 110 is coupled to the remote terminal 130 via a single twisted pair wire (or single copper loop) 120 adapted to carry the high-bit-rate digital subscriber line service. The central office and remote terminal transceivers 110, 130 provide the requisite signal processing and other core functions to support the high-bit-rate digital subscriber line service. Those skilled in the art should understand that the communications network 100 is submitted for illustrative purposes only and other network configurations (including communications networks compatible with digital subscriber line service) are well within the broad scope of the present invention.

Figure 2:
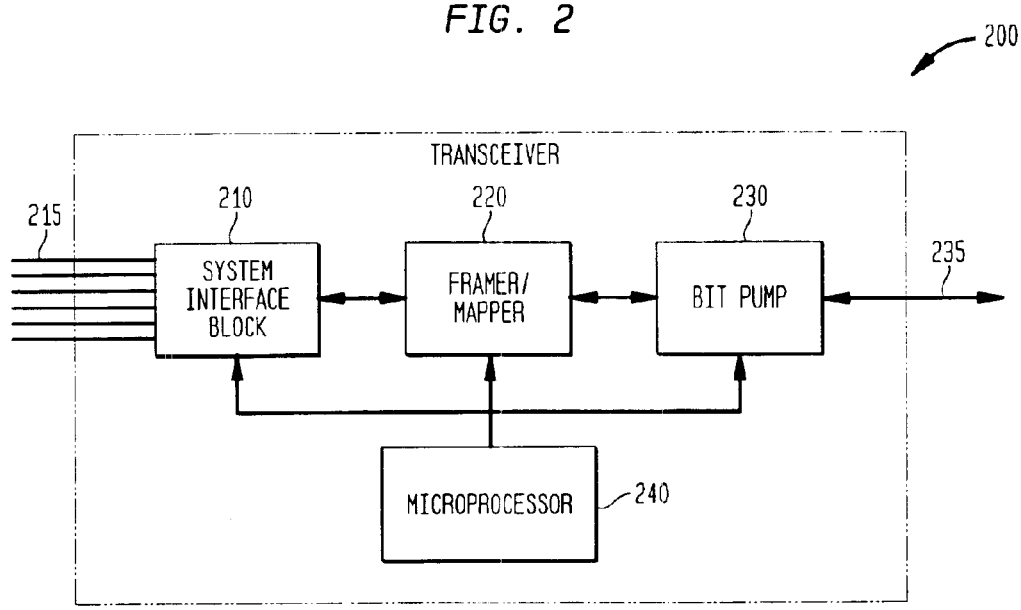
FIG. 2 illustrates a block diagram of an embodiment of a transceiver constructed according to the principles of the present invention.

Turning now to FIG. 2, illustrated is a block diagram of an embodiment of a transceiver 200 constructed according to the principles of the present invention. The transceiver 200 includes a system interface block 210 that provides an interface to, for instance, the public switched telephone network via T1 trunks (one of which is designated 215). The system interface block 210 can support any one of a number of transport medium and standards in addition to the T1 payload. The system interface block 210 performs system level functions such as processing commands/status information and providing connectivity to an embedded operations channel and an external system processor. The embedded operations channel is typically a virtual communications channel embedded in the physical layer for inter-transceiver and network maintenance purposes. The external system processor, in conjunction with an internal microprocessor, configures the transceiver 200 and monitors the operational status of the transceiver 200.

The transceiver 200 also includes a framer/mapper 220 coupled to the system interface block 210. The framer/mapper 220 provides transmission convergence between the standard interface block 210 and the frames associated with the information traversing a twisted pair wire (e.g., the HDSL2 frames). In conjunction therewith, the framer/mapper 220 provides frame synchronization, bit stuffing, jitter control processing and rate correction. The framer/mapper 220 also multiplexes/demultiplexes the channels associated with the transceiver 200, provides payload error detection and scrambles/descrambles signals in accordance with a particular application. Thus, the framer/mapper 220 is principally responsible for the transmission convergence within the transceiver 200.

The transceiver 200 further includes a bit pump 230 coupled to the framer/mapper 220. The bit pump 230 is the digital signal processing portion of the transceiver 200 and is coupled, via an analog front end, to a twisted pair wire 235 adapted to carry the high-bit-rate digital subscriber line service. A transmit path of the bit pump 230 receives data bits from the framer/mapper 220 and converts the bit stream into, for instance, 72× oversampled, 3-bit data for transmission by a digital-to-analog converter associated with the analog front end over the twisted pair wire 235. A receive path of the bit pump 230 receives the 3-bit, 72× oversampled received data from an analog-to-digital converter associated with the analog front end and converts the received data to an output bit stream for delivery to a deframer and, ultimately, to the framer/mapper 220.

The bit pump 230 generally performs two classes of signal processing, namely, symbol-time referenced and symbol-time independent processing. The symbol-time referenced processing includes functions like echo cancellation and equalization whereas symbol-time independent processing includes functions like transmitter digital sigma/delta modulation. An architecture associated with an embodiment of a bit pump 230 will be described with respect to FIG. 3.

The transceiver 200 still further includes a controller (e.g., an on-chip control microprocessor) 240 coupled to the system interface block 210, the framer/mapper 220 and the bit pump 230. The controller 240 communicates with and coordinates the operations between the system interface block 210, the framer/mapper 220 and the bit pump 230. For instance, the controller 240 performs the initialization process for the transceiver 200 by, among other things, initializing selected registers in the framer/mapper 220 and the bit pump 230 to a known state. The controller 240 generally writes or reads data to/from the mapper/framer 220 and the bit pump 230 using a memory mapped input/output operation through a peripheral bridge. While the read/write memory operation is intended to be used in debugging, characterization and production testing, it is not generally employed in end user applications, except for a built-in self testing mode.

The controller 240, however, has access to and updates the registers of the framer/mapper 220 and bit pump 230 during activation (including initialization) and communication phases of the transceiver 200. The controller 240 receives information such as performance characteristics and bit pump attributes (e.g., filter lengths, gains and signal scale factors) and provides control commands to control the transceiver 200. With regard to the bit pump 230, for instance, the controller 240 provides control commands to, without limitation, enable coefficient updates, select update gains, enable convolution and delay line updates, and probe node selection. Once the transceiver 200 reaches data transparency (i.e., showtime), however, the bit pump 230 can process data without continuing intervention from the controller 240, assuming no exception event occurs. Regarding the system interface block 210, the controller 240 accesses system command and status registers used for configuration and control reset, diagnostics, activation, embedded operations channel processing and other functions. The controller 240 is also intricately involved in synchronizing the operation of the components and systems during all phases of operation of the transceiver 200.

It should be understood that the representative transceiver 200 is submitted for illustrative purposes only and other transceiver configurations compatible with the principles of the present invention may be employed as the application dictates.

Figure 3:
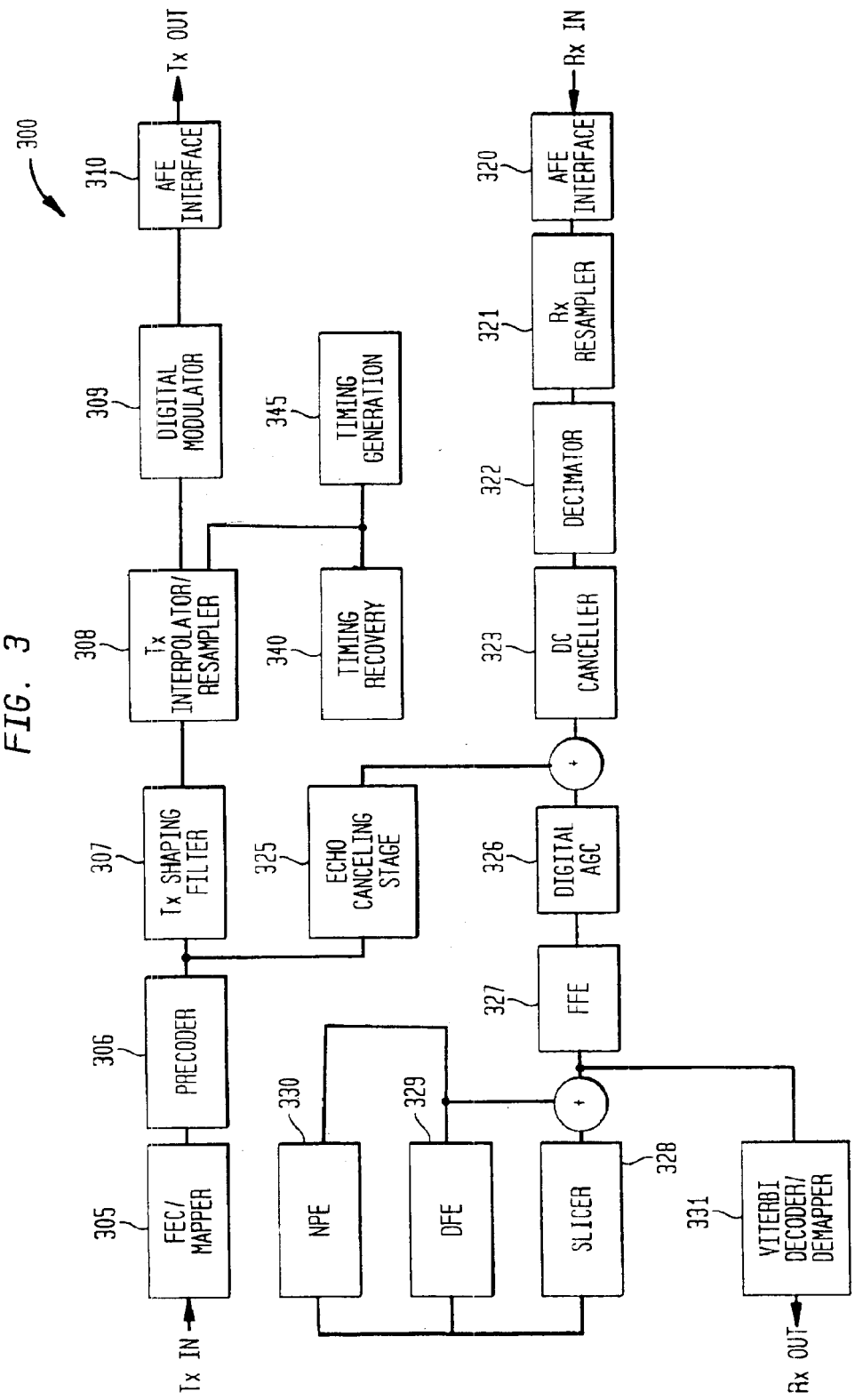
FIG. 3 illustrates a block diagram of an embodiment of a bit pump constructed according to the principles of the present invention.

Turning now to FIG. 3, illustrated is a block diagram of an embodiment of a bit pump 300 constructed according to the principles of the present invention. Again, the bit pump 300 primarily performs the digital signal processing functions associated with a transceiver and includes a transmit path and a receive path. While various blocks of the bit pump 300 are illustrated and described with respect to a transmitter or receiver portion of the bit pump 300, it should be understood that the circuits and systems that constitute the respective blocks perform functions on signals that span the bit pump 300 whether propagating along the transmit or receive path. Additionally, the functions associated with each block of the bit pump 300 are not necessarily discrete in nature. As will become more apparent, the functions are often integrated and resources are drawn from one functional block in the context another block to achieve the intended purpose. Finally, it should be understood that the circuits and systems associated with the present invention may be embodied in software, dedicated or hardwired discrete or integrated circuitry, or combinations thereof.

The bit pump 300 includes a forward error correction/mapper 305 coupled to an input of the transmit path. A signal presented at the input of the transmit path may be subject to various types of noise, in particular impulse noise, which is characteristically of short duration, but has a strong magnitude and a wide spectrum footprint. To provide a more reliable link, it is desirable to use a forward error correction coding techniques (e.g., a Reed-Solomon code) which are known to support reliable impulse noise resistance. Furthermore, the impulse noise immunity may be multiplied by a factor without additional redundancy by using forward error correction coding in conjunction with interleaving, where the factor is referred to as the depth of interleaving. Thus, the forward error correction/mapper 305 provides the forward error correction to a transmit signal presented at the input of the transmit path of the bit pump 300.

The bit pump 300 also includes a precoder 306 coupled to the forward error correction/mapper 305 in the transmit path. The precoder (e.g., commonly referred to as a channel precoder in the HDSL2 standard defined by the ANSI committee T1E1.4) is generally a fixed, non-linear filter that effectively implements a decision feedback equalization function in the transmitter portion of the bit pump 300. More specifically, the precoder 306 pre-distorts the transmitted signal so that after a corresponding receive signal propagating along the receive path passes through a feed forward equalization stage, there is insignificant post-cursor intersymbol interference distortion (or interference between adjacent data symbols caused by path distortion).

The precoder 306 is programmed by a controller of a transceiver (analogous to the controller 240 described with respect to FIG. 2) with decision feedback equalization coefficients that are calculated within the receiver portion of the bit pump 300 during activation. A motivation for using the precoder (e.g., a Tomlinson-Harashima precoder) 306 in lieu of a decision feedback equalizer at showtime is that the decision feedback equalization function is incompatible with a Viterbi decoder. To simultaneously realize the coding gain provided by a Viterbi decoder and the intersymbol interference cancellation provided by a decision feedback equalizer without noise enhancement, either the decision feedback equalizer should be replaced with the precoder 306 at showtime or the Viterbi decoder and decision feedback equalizer should be replaced with a reduced-state sequence detector. The precoder 306 is typically more efficient than the reduced-state sequence detector and, as such, the bit pump 300 employs the precoder 306 in the transmitter portion thereof.

The precoder 306, therefore, also employs a decision feedback equalizer 329 and a noise prediction equalizer 330 associated with the receiver portion of the bit pump 300. The decision feedback equalizer 329 and noise prediction equalizer 330 are trained during activation to perform equalization in conjunction with other tasks necessary to operate the bit pump 300 and then reconfigured (by a controller command) at showtime to perform the functions associated with the precoder 306. Thus, the complexity of the precoder 306 is reduced. An input signal to the precoder 306 includes symbols from the forward error correction/mapper 305 and an output of the precoder 306 is a substantially white, uniform distributed signal sampled at the symbol rate.

The bit pump 300 also includes a transmitter shaping filter 307 coupled to the precoder 306 in the transmit path. The transmitter shaping filter 307 is a typically a finite impulse response (non-adaptive) digital filter that receives data at a 1× rate, interpolates to a 4× rate, and shapes the power spectrum density of the resulting 4× rate signal. The finite impulse response filter is programmable (i.e., the filter coefficients are stored in random access memory/registers) and the default settings for the transmitter shaping filter 307 are generally unknown, meaning that the transmitter shaping filter 307 is programmed by the controller at powerup. In an exemplary embodiment of the present invention, the transmitter shaping filter 307 can accommodate DSL-based technology and is compatible with the requirements associated with HDSL2. For instance, the length of the filter (e.g., 128 taps) is designed to meet the requirements associated with HDSL2.

The programmability of the transmitter shaping filter 307 provides several advantages for the bit pump 300. First, it allows the bit pump 300 to be applied in multi-rate or repeater applications. It also allows the system signal-to-noise ratio slicer margins to be improved when reductions can be made in component tolerances in the line interface to the bit pump 300. That is, tighter tolerances allow the transmit spectra to be refined to be closer to the upper bound set forth in the HDSL2 standard.

The bit pump 300 also includes a transmitter interpolator/resampler 308 coupled to the transmitter shaping filter 307 in the transmit path. The transmitter interpolator/resampler 308 upsamples the output of the transmitter shaping filter 307 to a sampling rate compatible with a digital modulator 309 coupled thereto. The architecture of the transmitter interpolator/resampler 308 generally employs a multiplier-free architecture based on a cascaded-integrator-comb interpolator [see, for instance, "An Economical Class of Digital Filters for Decimation and Interpolation," by E. B. Hogenauer, Institute of Electronic and, Electrical Engineers (IEEE) Transactions on Acoustics, Speech, and Signal Processing, Vol. ASSP-29, No. 2, April 1981, which is incorporated by reference] to upsample from $4*F_{baud}$ to $72*F_{baud}$ followed by a first order Lagrange (linear) interpolator to resample the $72*F_{baud}$ output. The interpolator, therefore, increases the sampling rate by a factor of 18 (i.e., 72/4).

When determining the order (length) of the cascade-integrator-comb interpolator, there are generally two considerations, namely, the image attenuation and the passband droop. The interpolator is designed to suppress the images of the baseband signal such that the signals are below the level of the shaped quantization noise floor of the digital modulator 309. A fourth order cascade-integrator-comb interpolator should be adequate to ensure that the images in the transmit path are below (~5 dB) the level of the quantization noise.

Once the interpolation filter is chosen, any passband droop caused by that filter can be compensated for in the transmit path and typically by the transmitter shaping filter 307. While the compensation function increases the peak to root-mean-square ratio of the transmitter shaping filter 307, it does not significantly alter the peak to root-mean-square ratio of a signal arriving at the digital modulator 309 since the extra peaking added to compensate for the droop is removed by the cascaded-integrator-comb interpolator prior to reaching the digital modulator 309.

In addition to the above considerations, the overall gain of the cascaded-integrator-comb interpolator should be compensated for in the transmit path. The cascaded-integrator-comb interpolator in conjunction with the coefficients associated with the transmitter shaping filter 307 should be adequate to compensate the overall gain.

The resampler section (e.g., a linear interpolating resampler) of the transmitter interpolator/resampler 308 resamples the output of the interpolator according to the sampling phase and input delay-line shifts specified by a timing generator 345 associated with the bit pump 300. Thus, the transmitter interpolator/resampler 308 provides sampling phase and frequency corrections to the transmit signal for delivery to the digital modulator 309.

The digital modulator (e.g., a second order modulator) 309, coupled to the transmitter interpolator/resampler 308 in the transmit path, generally produces a 5-level output signal with the quantization noise shaped to minimize the noise in the passband. A transmitter analog-front-end interface 310 receives the 5-level quantized output signal from the digital modulator 309, converts the signal to an analog signal (via a digital-to-analog converter) and provides an interface at an output of the transmit path of the bit pump 300. Both the digital modulator 309 and the transmitter analog-front-end interface 310 typically operate on a common 144× clock, with a transfer rate of 72×(the sample rate) desired. To facilitate this, the transmitter analog-front-end interface 310 generates a 72× sample transfer clock signal and the 5-level quantized output is coded into three bits. The output data from the bit-pump 300 changes at the rising edge of the sample transfer clock signal and the transmitter analog-front-end interface 310 should sample the digital modulator 309 output data at the falling edge of the sample transfer clock signal.

Turning now to the receiver portion of the bit pump 300, a receiver analog-front-end interface 320 is coupled to an input of the receive path of the bit pump 300. The receiver analog-front-end interface 320 receives an analog signal from an HDSL2 path and converts the signal to a digital signal via a analog-to-digital converter associated therewith. The analog-to-digital converter and the bit pump 300 typically operate on a common 144× clock and a transfer rate of 72× (the sample rate) is desirable. The output of the analog-to-digital converter advantageously includes three single-bit outputs, which are grouped into a three-bit bus. The data at the output of the receiver analog-front-end interface 320 transitions at the rising edge of the clock pulse and the bit-pump 300 samples the analog-to-digital converter input data at the falling edge of the clock pulse.

The bit pump 300 also includes a receiver resampler 321 coupled to the receiver analog-front-end interface 320 in the receive path. The receiver resampler (including, for instance, a third order LaGrange interpolation stage and a linear interpolating stage) 321 merges the three outputs of the analog-to-digital converter from the receiver analog-front-end interface 320 into a single output and resamples the signal to phase-lock the sampling phase associated with a remote terminal and central office of a communication network employing the bit pump 300. In the central office, the transmit and receive timing is generally locked to a local oscillator and therefore fractional resampling is unnecessary. In the remote terminal, the signals associated with the timing generator 345 and receiver resampler 321 necessitate sampling phase, input delay-line shifts and output sample production times to synchronize a derived symbol clock to the remote terminal's local oscillator associated with the timing generator 345.

The bit pump 300 also includes a decimator 322 coupled to the receiver resampler 321 in the receive path. The decimator 322 downsamples the output of the receive resampler 321 from the $72*F_{baud}$ to a $2*F_{baud}$ symbol rate. The decimator 322 generally includes the following cascaded filter elements, namely, a cascaded-integrator-comb decimator to downsample from $72*F_{bad}$ to $8*F_{baud}$, a fifth order power-symmetric decimation filter to decimate from $8*F_{baud}$ to $4*F_{baud}$, and a seventh order power-symmetric decimation filter to decimate from $4*F_{baud}$ to $2*F_{baud}$.

The first decimation filter element uses a multiplier-free architecture based on the cascaded-integrator-comb filter structure analogous to the structure employed in the transmitter interpolator/resampler 308. The following two factors may be used to determine the decimation ratio and cascaded-integrator-comb filter order, namely, the quantization noise aliasing and the passband attenuation. In general, the lower the output sample rate, the greater the attenuation at the edge of the passband for a fixed bandwidth passband. For instance, employing a cascaded-integrator-comb decimation ratio of 18 to produce a $4*F_{baud}$ output, the attenuation at the edge of the passband in the signal received by the remote terminal would be ~2.8 dB for a filter that would provide ~68 dB of quantization noise suppression. If instead a cascaded-integrator-comb decimation ratio of nine is selected, the attenuation at the edge of the passband is reduced to ~0.7 dB with ~95 dB quantization noise suppression. To keep the decimator 322 from hindering the analog-digital-converter performance, a decimation ratio of nine and a filter order of five is suggested.

The second decimation filter element uses a canonical-signed-digit multiplier architecture based on the power-symmetric elliptic impulse response filter structure. Although such filters are based on equiripple, elliptic filters, the resulting filter from coefficient quantization is generally not considered elliptic since passband and stopband are no longer equiripple. Nevertheless, the power-symmetric property is maintained after coefficient quantization. It is this property that ensures that for an acceptable stopband attenuation, passband ripple will be insignificant. The second decimation filter is a fifth order power-symmetric decimation filter.

The third decimation filter element also uses a power-symmetric infinite impulse response filter structure. The third decimation filter is a seventh order power-symmetric decimation filter. Thus, the decimator 322 allows sampling phase and frequency corrections to be made on the receive signal propagating along the receive path. For a better understanding of the design criteria associated with such filter elements, see "Multirate Systems and Filter Banks," by P. P. Vaidyanathan, Prentice Hall Signal Processing Series, Chap. 5, Section 5.3, pp. 211–213, July 1992, which is incorporated herein by reference.

The bit pump 300 also includes a DC canceller 323 coupled to the decimator 322 in the receive path. In presence of fixed-point elements, such as a digital-to-analog converter, there is a possibility of a parasitic DC component in a canceled echo signal. While this component does not affect the residual echo root-mean-square value, it presents a concern regarding a feed forward and decision feedback equalization combination due to the lack of a transmitted signal. This artifact may account for as much as 1 dB of slicer mean squared errors at steady state operation. The DC canceller 323 (including, for instance, a single tap least-mean-square filter adapting to the steady value of one) is designed to reduce this degradation.

The bit pump 300 also includes an echo canceling stage 325 interposed between the transmit and receive path. The echo canceling stage 325 substantially cancels linear echo over the full dynamic range of the bit pump 300. The echo canceling stage 315 may be partitioned into master and slave echo canceling stages to assist in further defining and ultimately reducing the echo. Another advantage associated with this architecture is an enhanced capability to accommodate both updates and disturber or other perturbations during showtime operation. A significant perturbation may be caused by a changing or slewing of the ambient temperature during steady-state or showtime operation. The perturbation typically causes a significant degradation in system performance of a conventional echo canceller. In particular, it can account for as much as 4.7 dB of allocated signal-to-noise margin.

The bit pump 300 also includes a digital automatic gain controller 326 coupled to the DC canceller 323 in the receive path. The digital automatic gain controller 326 allows the bit pump 300 to process the data precisions that follow the echo canceling stage 325. The digital automatic gain controller 326 also employs a least-mean-square algorithm to train a feed forward equalization function without normalization.

More specifically, the digital automatic gain controller 326 limits the probability of clipping (generally the signal peaks of the analog-to-digital and digital-to-analog converters) to a desired level by means of fixing the output signal variance. A secondary effect of this operation is to alleviate the need for error normalization in feed forward equalization least-mean-square algorithm and to reduce the dynamic range requirement for feed forward equalization coefficients.

The bit pump 300 also includes an equalizer coupled to the DC canceller 323 and the echo canceling stage 325 in the receive path. The equalizer includes a feed forward equalizer 327, decision feedback equalizer 329 and a noise prediction equalizer 330. The feed forward equalizer 327 cooperates with the decision feedback equalizer 329 to whiten noise and equalize a linear distortion associated with the receive path. For instance, with 384 taps, the feed forward equalizer 327 can come within 0.2 dB of the optimal (signal-to-noise ratio margin) performance on a higher level standard noise case. The noise prediction equalizer 330 removes any correlation which may be left in the error signal after the equalization function. The noise prediction equalizer 330 also accelerates convergence within the bit pump 300. As will become more apparent, portions of the equalizer can be reconfigured at showtime to become part of the precoder 306.

The bit pump 300 also includes a slicer 328 and a Viterbi decoder/demapper 331 coupled to a summing node with the equalizer in the receive path. The slicer 328 is a symbolby-symbol decoder configured to slice pulse amplitude modulated signals in the bit pump 300 including signals associated with the echo canceling stage 325. The Viterbi decoder/demapper 331 decodes a 512-state code recommended in the HDSL2 standard and demaps the receive signal for egress from an output of the receive path of the bit pump 300.

The bit pump 300 also includes a timing recoverer 340 and timing generator 345. The timing recoverer 340 allows very fine control of sampling timing with very little jitter. For example, the transmit jitter in the remote terminal is generally small enough that a jitter echo canceller is not necessary. The timing generator 345 is proximally located between the timing recoverer 340 and the transmitter resampler of the transmitter interpolator/resampler 308 and the receiver resampler 321. The timing recoverer 340 is generally a phase detector and frequency integrator. A burst phase correction and updated frequency estimate are generally computed every 400 symbols by timing recovery and sent to the timing generator 345 to be used to control the transmitter resampler and the receiver resampler 321.

In the timing generator 345 and transmitter and receiver resamplers 321, the nominal sampling rate is $72*F_{baud}$, thereby allowing the sampling phase to be maintained with reference to 72×samples as described above. Additionally, the various elements of the timing generator 345 may be controlled by a central state machine which dictates when transmit and receive samples are to be generated and when transmit and receive input delay lines are to be advanced.

It should be understood, that the representative bit pump 300 is submitted for illustrative purposes only and other bit pump configurations compatible with the principles of the present invention may be employed as the application dictates. The following FIGUREs illustrate embodiments of an equalizer both during activation and then at showtime and an embodiment of a precoder at showtime for the bit pump 300. The equalizer is used in the receive path while the precoder is employed in the transmit path. Although the equalizer and the precoder are distinct functionally, they share hardware in the implementations of the illustrated embodiments. Before precoder exchange, the precoder does not operate and at showtime (after precoder exchange), a noise prediction equalizer and decision feedback equalizer in the equalizer are turned off while the precoder is activated. After precoder exchange, the noise prediction equalizer and decision feedback equalizer are reconfigured and used to implement the precoder. The details of this reconfiguration and implementation are discussed in the sections that follow.

Figure 4:
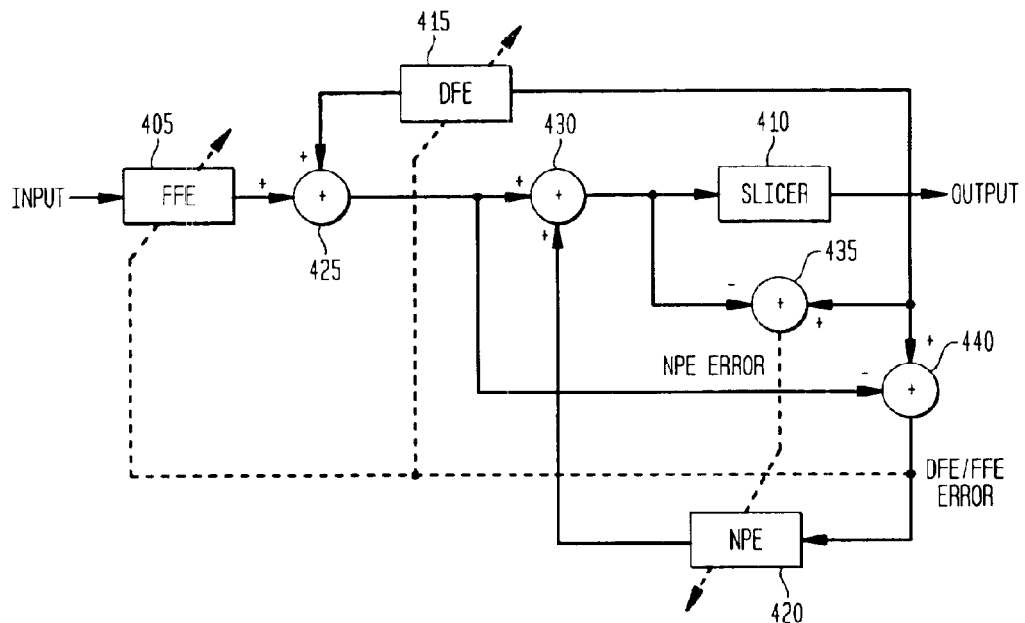
FIG. 4 illustrates a block diagram of an embodiment of a configuration of an equalizer during activation prior to showtime constructed according to the principles of the present invention.

Turning now to FIG. 4, illustrated is a block diagram of an embodiment of a configuration of an equalizer during activation prior to showtime constructed according to the principles of the present invention. The equalizer includes a feed forward equalizer 405, interposed between a receive path and a slicer 410 having an output coupled to the receive path, a decision feedback equalizer 415 having an input coupled to the slicer 410, and a noise prediction equalizer 420.

A first summing node 425, associated with the equalizer, has inputs coupled to the feed forward equalizer 405 and the decision feedback equalizer 415. A second summing node 430, associated with the equalizer, has inputs coupled to the first summing node 425 and the noise prediction equalizer 420, and an output coupled to the slicer 410. A third summing node 435, associated with the equalizer, has inputs coupled to the second summing node 430 and the slicer 410, and an output coupled to the noise prediction equalizer 420.

Finally, a fourth summing node 440, associated with the equalizer, has inputs coupled to the first summing node 425 and the slicer 410, and an output coupled to the noise prediction equalizer 420. Additionally, the output of the fourth summing node 440 is coupled to the feed forward equalizer 405 and the decision feedback equalizer 415.

The equalizer employs three adaptive filters in the form of the feed forward equalizer 405, the decision feedback equalizer 415 and the noise prediction equalizer 420, portions of which form a filter circuit constructed in accordance with the principles of the present invention. The noise prediction equalizer 420 generates a noise prediction equalizer coefficient during activation of a bit pump employing the equalizer to reduce an intersymbol interference associated with a receive signal propagating along the receive path of the bit pump. In the same manner, the decision feedback equalizer 415 generates a decision feedback equalizer coefficient during the activation of the bit pump to reduce the intersymbol interference associated with the receive signal.

The feed forward equalizer 405 and decision feedback equalizer 415 work together to whiten noise and equalize the linear distortion caused by a channel coupled to a receive path of a bit pump employing the equalizer. The noise prediction equalizer 420 removes any correlation which may be left after equalization. In principle, the noise prediction equalizer 420 provides only limited improvement over that provided by the feed forward equalizer 405 and the decision feedback equalizer 415 if optimal coefficients are selected therefor.

The noise prediction equalizer 420, however, accelerates training in that it accelerates convergence of the adaptive filters. Without the noise prediction equalizer 420, the equalizer may be several decibels short of optimization by the end of activation. Therefore, the noise prediction equalizer 420 provides key performance advantage for a bit pump employing the equalizer. Advantageously, further utilization of the noise prediction equalizer 420 in a precoder, employing, for instance, a Tomlinson-Harashima algorithm, also provides a less complex system reducing, for instance, the hardware associated with the precoder.

Before precoder exchange and during activation, the output of the feed forward equalizer 405 is scaled and added to the output of the decision feedback equalizer 415 and the noise prediction equalizer 420 in the second summing node 430 to compute the input to the slicer 410. The input of the slicer 410 is then subtracted from the output of the slicer 410 in the third summing node 435 and the result is used as an error signal to adapt the noise prediction equalizer 420. The sum of the outputs of the feed forward equalizer 405 and the decision feedback equalizer 415 is subtracted from the output of the slicer 410 in the fourth summing node 440. The resulting output of the fourth summing node 440 provides an input to the noise prediction equalizer 420. Additionally, the output of the fourth summing node 440 provides an error signal to adapt the feed forward equalizer 405 and the decision feedback equalizer 415.

Figure 5:
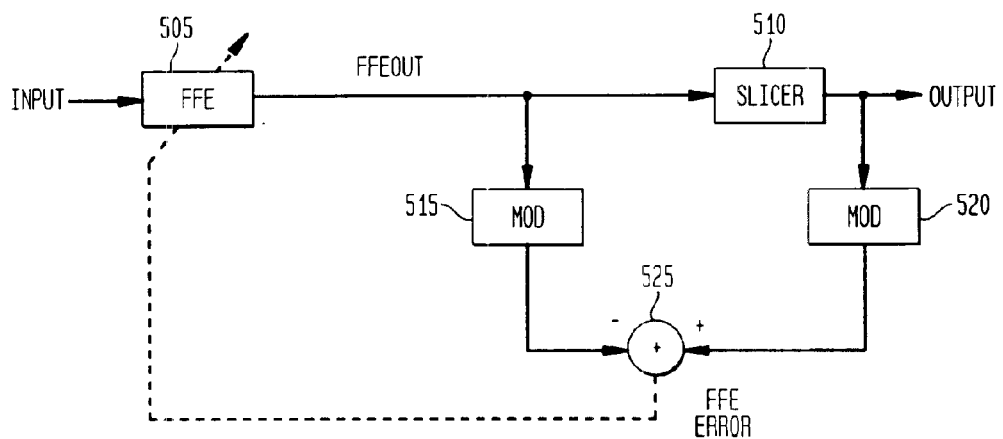
FIG. 5 illustrates a block diagram of an embodiment of a configuration of an equalizer at showtime following equalization constructed according to the principles of the present invention.

Turning now to FIG. 5, illustrated is a block diagram of an embodiment of a configuration of an equalizer at showtime following equalization constructed according to the principles of the present invention. The equalizer, after precoder exchange, includes a feed forward equalizer 505, interposed between a receive path and a slicer 510 having an output coupled to the receive path, first and second modulo units 515, 520 and a summing node 525 that provides an error signal to adaptively configure the feed forward equalizer 505. The output of the feed forward equalizer 505 is scaled to compute an input to the slicer 510. Then, the modulo of the input of the slicer 510 is subtracted from the modulo of the output of the slicer 410 to compute the error signal used in adapting the feed forward equalizer 505.

The first and second modulo units 515, 520 are defined so that for each output value ffeout of the feed forward equalizer 505, an integer d is selected such that −1≦ffeout+2d<1. Then, the modulo may be expressed as mod(ffeout)= ffeout+2d. This modulo operation is also the basic modulo operation used in the implementation of the precoder discussed with respect to FIG. 6.

Figure 6:
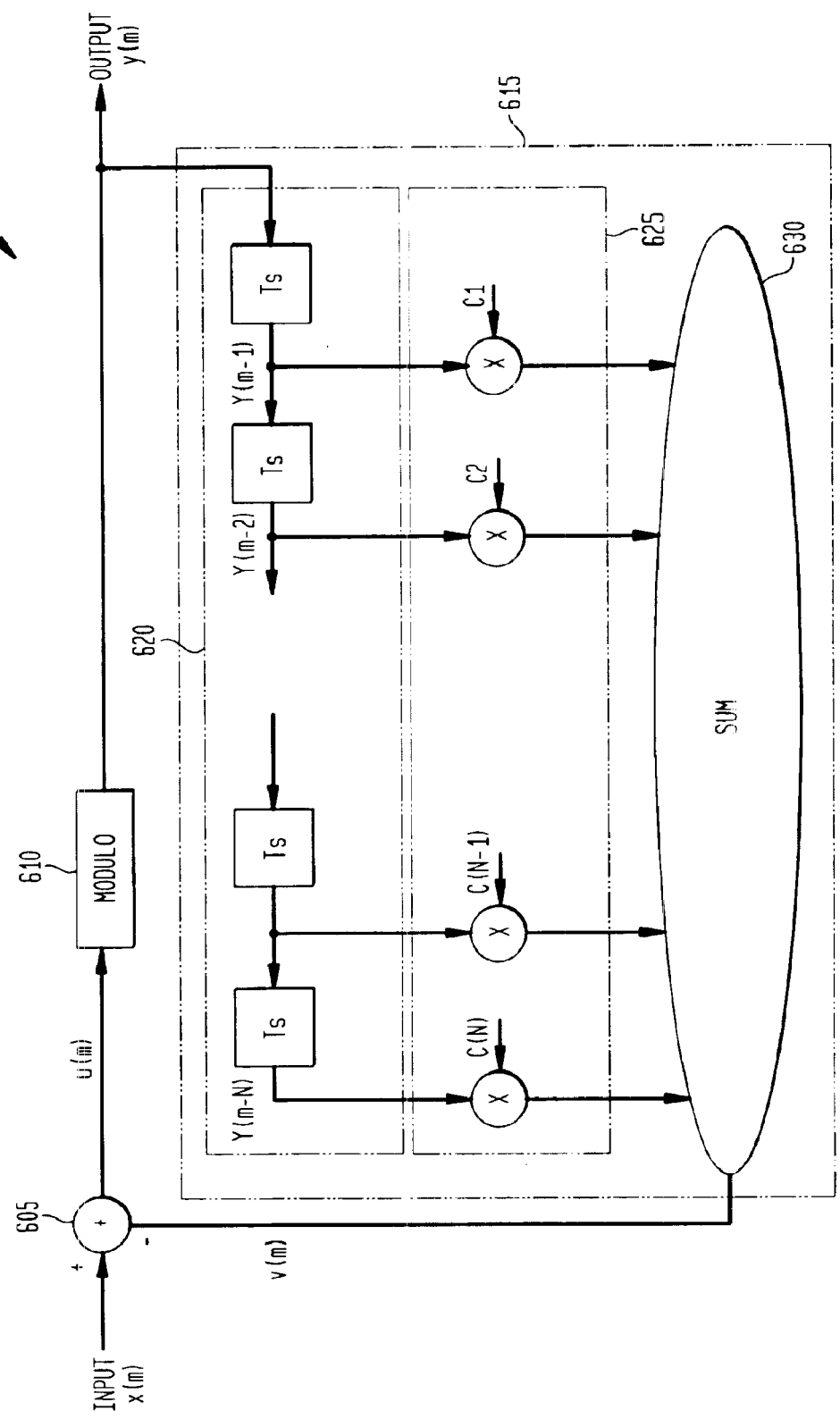
FIG. 6 illustrates a block diagram of an embodiment of a precoder constructed according to the principles of the present invention.

Turning now to FIG. 6, illustrated is a block diagram of an embodiment of a precoder 600 constructed according to the principles of the present invention. The precoder 600, coupled to a transmit path, includes an input summing node 605 that receives a filter input signal x(m), and a modulo unit 610 that receives an input summing node output signal u(m) and provides a filter output signal y(m). The precoder 600 also includes a feedback circuit 615 that receives the filter output signal y(m) and provides a feedback circuit output signal v(m).

The feedback circuit 615 includes a delay line 620 having N series-coupled delay stages, which are generally designated Ts and correspond to a delay of one symbol time. The feedback circuit 615 also includes a coefficient array 625 having N coefficient multipliers, which are generally designated X. Each coefficient multiplier X receives a coefficient, which is generally designated C(N), and a corresponding delayed output signal from an appropriate delay stage tap in the delay line, generally designated Y(m−N) The output of each of the coefficient multipliers X is presented to a feedback summing block 630 for summation. The feedback summing block 630 provides the feedback output signal v(m) of the feedback circuit 615 to the input summing node 605. The feedback output signal v(m) may be expressed by $$v(m) = \sum_{k=1}^{N} C_k y(m-k).$$

The precoder 600 performs the intended function by employing the Tomlinson-Harashima algorithm in the illustrated embodiment. The precoder 600, which conforms to the HDSL2 ANSI standard, is a fixed, non-linear filter that effectively implements a decision feedback equalizer function in the transmitter of a bit pump (see, for instance, the bit pump 300 illustrated and described with respect to FIG. 3). That is, the precoder 600 pre-distorts the transmitted signal so that there is minimal post-cursor distortion from intersymbol interference. The precoder 600 does not generally operate during activation wherein its input just passes through to its output. At showtime however, the precoder 600 is operational.

After precoder exchange, a decision feedback equalizer and noise prediction equalizer (see, for instance, the decision feedback equalizer 415 and noise prediction equalizer 420 illustrated and described with respect to FIG. 4), are concatenated to form the feedback filter 615 as illustrated in FIG. 6. That is, the respective delay lines and coefficient arrays associated with the decision feedback equalizer and the noise prediction equalizer are respectively concatenated to form the delay line 620 and the coefficient array 625. The feedback circuit 615 convolves the delay line signals with their respective coefficients and presents the outputs collectively to the feedback summing block 630 for summation as a convolution sum. The modulo unit 610 is defined so that for each value of the input summing node output signal u(m), an integer d(m) is selected such that −1≦u(m)+2d(m) <1. Then, the filter output signal y(m) may be expressed as y(m)=u(m)+2d(m).

In the illustrated embodiment, reuse of the underlying systems (e.g., the hardware) constituting the noise prediction equalizer and the decision feedback equalizer to implement the precoder 600 is achieved with a small inefficiency. The decision feedback equalizer is typically designed with a 14-bit wide delay line wherein only 2 of the 14 bits are used during normal decision feedback equalizer operation in the equalizer during activation prior to showtime. When the decision feedback equalizer is reconfigured as part of the precoder, the coefficient updates are disabled and all 14 bits in the delay line are used to compute the convolution sum.

The filters that form the filter circuit start their operations synchronously with a symbol clock signal and finish their computations at different times during the symbol period. All of the filters generate a control signal to indicate when they are busy. The feedback summing block 630 receives the busy signals as control inputs and begins computing error signals and appropriate inputs to the feedback circuit 615 after all the filters have finished their normal computations and their outputs are valid.

Figure 7:
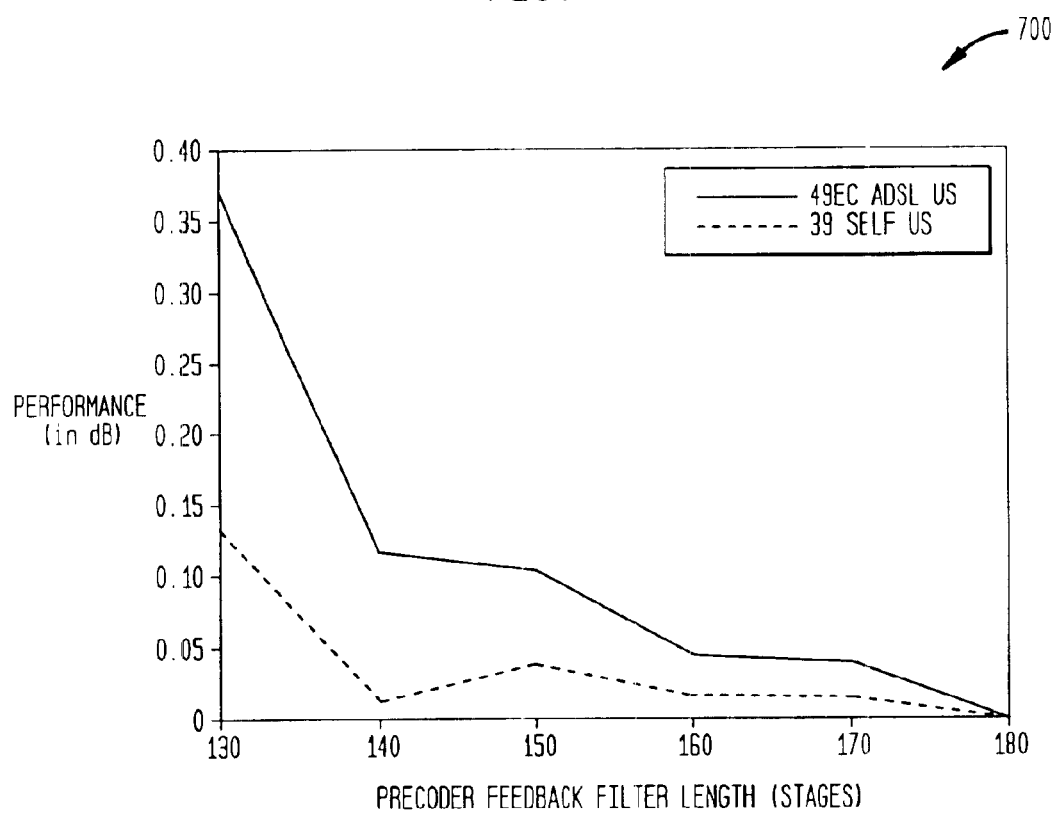
FIG. 7 illustrates a graph showing precoder performance degradation versus precoder feedback filter length

Turning now to FIG. 7, illustrated is a graphical representation 700 of precoder performance degradation versus precoder feedback filter length. The graphical representation 700 indicates that precoder performance degradation is minimized to about zero decibels for a precoder feedback filter length of 180 stages. Therefore, to attain a maximized performance, the illustrated embodiment generally uses a feedback filter length of 180 stages.

The precoder 600 of FIG. 6 is implemented by using two feedback filter processing blocks, namely, a 128 stage decision feedback equalizer block and a 52 stage noise prediction equalizer block. When cascaded, the blocks form the 180 stage precoder 600 configurable to attain the desirable performance. The implemented precoder 600 precision for the filter output signal y(m) is one integer bit and 14 fractional bits. It is also suggested that the type of coefficient multiplier X used in the illustrated embodiment have at least one more fractional bit than the accumulator type, thereby requiring 15 fractional bits.

Operation of the modulo unit 610 wraps data between −1 and 1. Therefore, the hardware implementation allows a simple pruning of the extra integer bits until there is only one integer bit remaining. A further simplified implementation can be achieved if the summations in the convolution are considered in the context of the modulo two operation. This is accomplished by setting the precision of the accumulation to only one integer bit and using unsaturated overflow arithmetic, thereby automatically implementing the modulo operation.

Due to the precision requirements in the HDSL2 ANSI standard, the precoder coefficients are generally represented as 22-bit, two's complement numbers. The five most significant bits represent integer numbers from −16 (10000) to +15 (01111), and the remaining 17 bits are the fractional bits. Of course, the minimum number of precoder coefficients are 180 in the illustrated embodiment. If fewer than 180 precoder coefficients are used in an alternative embodiment, the remaining bits in the field are set to zero.

It should be understood, that the embodiments of the equalizers and precoder employing the filter circuit constructed according to the principles of the present invention illustrated and described with respect to the preceding FIGUREs are submitted for illustrative purposes only and other configurations compatible with the principles of the present invention may be employed as the application dictates.

In summary, the present invention introduces, in one aspect, a filter circuit that performs an equalization function during the activation of the bit pump and is reconfigured as a precoder during showtime of the bit pump. During activation, the various adaptive circuits of the bit pump are trained to optimize their performance associated with a particular operating environment. Showtime begins when activation is complete and a condition of data transparency exists allowing stable operation of the bit pump. At the inception of showtime, at least portions of the hardware embodying the noise prediction equalizer and the decision feedback equalizer along with their coefficient values developed during activation are reconfigured to serve as the precoder. This reconfiguration provides an effective solution for performance enhancement of a bit pump during showtime.

For a better understanding of digital communications, in general, and digital subscriber line services including the standards and systems that support the technology, see "Understanding Digital Subscriber Line Technology" by Thomas Starr, Peter Silverman, and John M. Coiffi, Prentice Hall (1998), and "Digital Communication" by Edward A. Lee and David G. Messerschmitt, Kluwer Academic Publishers (1994), which are incorporated herein by reference.

Although the present invention has been described in detail, those skilled in the art should understand that they can make various changes, substitutions and alterations herein without departing from the spirit and scope of the invention in its broadest form.

What is claimed is:

1. A filter circuit for use with a bit pump having a transmit and receive path, comprising:
   a noise prediction equalizer configured to generate a noise prediction equalizer coefficient during activation of said bit pump to reduce an intersymbol interference associated with a receive signal propagating along said receive path; and
   a decision feedback equalizer configured to generate a decision feedback equalizer coefficient during said activation of said bit pump to reduce said intersymbol interference associated with said receive signal, said noise prediction equalizer reconfigurable to concatenate with said decision feedback equalizer during showtime of said bit pump to form a portion of a precoder in said transmit path.

2. The filter circuit as recited in claim 1 wherein said noise prediction equalizer and said decision feedback equalizer are couplable to a feed forward equalizer during said activation of said bit pump.

3. The filter circuit as recited in claim 1 wherein said noise prediction equalizer and said decision feedback equalizer are couplable to a slicer during said activation of said bit pump.

4. The filter circuit as recited in claim 1 wherein each of said noise prediction equalizer and said decision feedback equalizer comprise delay lines associated therewith.

5. The filter circuit as recited in claim 1 wherein said noise prediction equalizer and said decision feedback equalizer comprise noise prediction equalizer and decision feedback equalizer coefficient arrays respectively associated therewith.

6. The filter circuit as recited in claim 1 wherein said precoder is a Tomlinson-Harashima precoder and said portion is a feedback filter of said precoder.

7. The filter circuit as recited in claim 1 wherein said precoder comprises a plurality of taps.

8. A method of configuring a filter circuit for use with a bit pump having a transmit and receive path, comprising:
   generating a noise prediction equalizer coefficient with a noise prediction equalizer during activation of said bit pump to reduce an intersymbol interference associated with a receive signal propagating along said receive path;
   generating a decision feedback equalizer coefficient with a decision feedback equalizer during said activation of said bit pump to reduce said intersymbol interference associated with said receive signal; and
   reconfiguring said noise prediction equalizer to concatenate with said decision feedback equalizer during showtime of said bit pump to form a portion of a precoder in said transmit path.

9. The method as recited in claim 8 further comprising coupling said noise prediction equalizer and said decision feedback equalizer to a feed forward equalizer during said activation of said bit pump.

10. The method as recited in claim 8 further comprising coupling said noise prediction equalizer and said decision feedback equalizer to a slicer during said activation of said bit pump.

11. The method as recited in claim 8 wherein each of said noise prediction equalizer and said decision feedback equalizer comprise delay lines associated therewith.

12. The method as recited in claim 8 wherein said noise prediction equalizer and said decision feedback equalizer comprise noise prediction equalizer and decision feedback equalizer coefficient arrays respectively associated therewith.

13. The method as recited in claim 8 wherein said precoder is a Tomlinson-Harashima precoder and said portion is a feedback filter of said precoder.

14. The method as recited in claim 8 wherein said precoder comprises a plurality of taps.

15. A bit pump having a transmit and receive path, comprising:
   a modulator, coupled to said transmit path, that reduces a noise associated with a transmit signal propagating along said transmit path;
   an analog-to-digital converter, coupled to said receive path, that converts a receive signal received at said bit pump into a digital format;
   a decimator, coupled to said analog-to-digital converter, that downsamples said receive signal propagating along said receive path;
   a filter circuit, including:
      a noise prediction equalizer that generates a noise prediction equalizer coefficient during activation of said bit pump to reduce an intersymbol interference associated with said receive signal, and
      a decision feedback equalizer that generates a decision feedback equalizer coefficient during said activation of said bit pump to reduce said intersymbol interference associated with said receive signal, said noise prediction equalizer being adapted to concatenate with said decision feedback equalizer during showtime of said bit pump to form a portion of a precoder in said transmit path; and
   an echo canceling system, coupled between said transmit and receive path, that attenuates an echo in said receive signal.

16. The bit pump as recited in claim 15 further comprising a feed forward equalizer coupled to said noise prediction equalizer and said decision feedback equalizer during said activation of said bit pump.

17. The bit pump as recited in claim 15 further comprising a slicer coupled to said noise prediction equalizer and said decision feedback equalizer during said activation of said bit pump.

18. The bit pump as recited in claim 15 wherein each of said noise prediction equalizer and said decision feedback equalizer comprise delay lines associated therewith.

19. The bit pump as recited in claim 15 wherein said noise prediction equalizer and said decision feedback equalizer comprise noise prediction equalizer and decision feedback equalizer coefficient arrays respectively associated therewith.

20. The bit pump as recited in claim 15 wherein said precoder is a Tomlinson-Harashima precoder and said portion is a feedback filter of said precoder.

21. The bit pump as recited in claim 15 wherein said precoder comprises a plurality of taps.

22. A transceiver, comprising:
   a framer that formats signals within said transceiver;
   a bit pump coupled to said framer and having a transmit and receive path, including:
      a modulator, coupled to said transmit path, that reduces a noise associated with a transmit signal propagating along said transmit path;
      an analog-to-digital converter, coupled to said receive path, that converts a receive signal received at said bit pump into a digital format;
      a decimator, coupled to said analog-to-digital converter, that downsamples said receive signal propagating along said receive path;
      a filter circuit, including:
         a noise prediction equalizer that generates a noise prediction equalizer coefficient during activation of said bit pump to reduce an intersymbol interference associated with said receive signal, and
         a decision feedback equalizer that generates a decision feedback equalizer coefficient during said activation of said bit pump to reduce said intersymbol interference associated with said receive signal, said noise prediction equalizer adapted to concatenate with said decision feedback equalizer during showtime of said bit pump to form a portion of a precoder in said transmit path; and
      an echo canceling system, coupled between said transmit and receive path, that attenuates an echo in said receive signal; and
   a controller that controls an operation of said framer and said bit pump.

23. The transceiver as recited in claim 22 wherein said bit pump further comprises a feed forward equalizer coupled to said noise prediction equalizer and said decision feedback equalizer during said activation of said bit pump.

24. The transceiver as recited in claim 22 wherein said bit pump further comprises a slicer coupled to said noise prediction equalizer and said decision feedback equalizer during said activation of said bit pump.

25. The transceiver as recited in claim 22 wherein each of said noise prediction equalizer and said decision feedback equalizer comprise delay lines associated therewith.

26. The transceiver as recited in claim 22 wherein said noise prediction equalizer and said decision feedback equalizer comprise noise prediction equalizer and decision feedback equalizer coefficient arrays respectively associated therewith.

27. The transceiver as recited in claim 22 wherein said precoder is a Tomlinson-Harashima precoder and said portion is a feedback filter of said precoder.

28. The transceiver as recited in claim 22 wherein said precoder comprises a plurality of taps.

\* \* \* \* \*